UNITED STATES PATENT OFFICE.

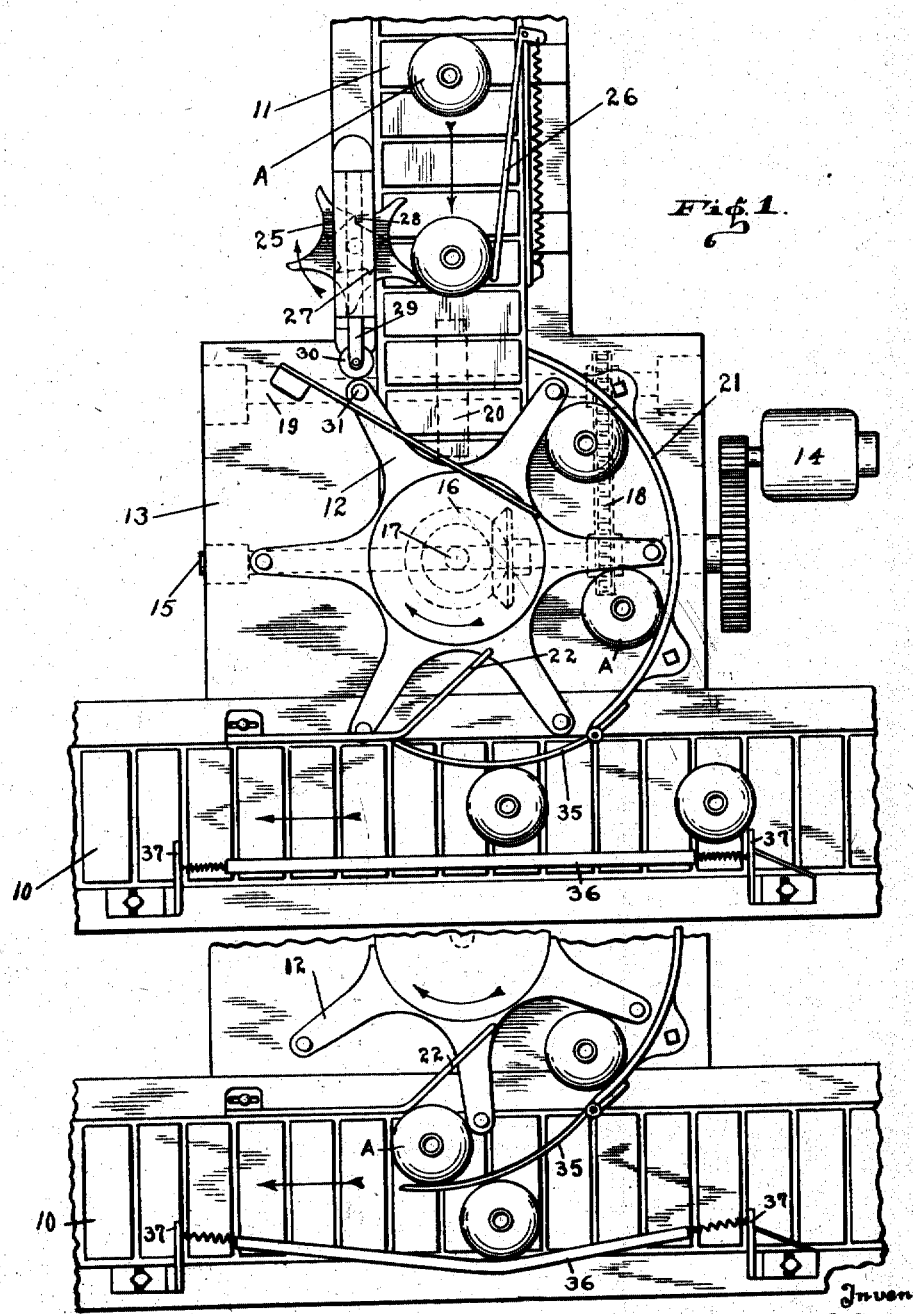

WILLIAM H. JOHNSON, OF TERRE HAUTE, INDIANA.

TRIBUTARY-FEEDER CONTROL.

1,281,581.   Specification of Letters Patent.   Patented Oct. 15, 1918.

Application filed July 18, 1917. Serial No. 181,210.

*To all whom it may concern:*

Be it known that I, WILLIAM H. JOHNSON, a citizen of the United States, residing at Terre Haute, in the county of Vigo and State of Indiana, have invented a new and useful Tributary-Feeder Control, of which the following is a specification.

In many plants articles are carried on conveyers, and sometimes it is desired that there be branch conveyers which feed to a main conveyer as tributaries. This happens in glass plants, or in breweries, where a number of bottle machines or filling machines discharge on to their separate conveyers, all of which discharge on to a main conveyer. In many of these, it is essential that the bottle or other article which is discharged from a tributary conveyer on to the main conveyer shall not be interfered with by a similar bottle or other article already on the main conveyer, as a collision between two bottles or other articles might result in disaster, such as the breaking of the machine or of one or both articles, or, as when the conveyer is carrying hot bottles just formed by a bottle machine, the sticking together of the colliding bottles.

In my co-pending application Ser. No. 142,981, filed on January 18, 1917, I have shown an invention whereby the possibility of such collisions, between articles on a main conveyer and articles discharged thereupon from a tributary conveyer, is avoided. My present invention has the same object in view; with the additional object of simplifying the construction. It does this by eliminating the control star wheel shown in such application and providing a hinged gate and a flexible guide rail, coöperating with the other elements in the manner set forth hereinafter.

The accompanying drawing illustrates my invention. Figure 1 is a plan view of a main conveyer and one tributary conveyer feeding thereto, showing my invention embodied therein, the hinged gate and the flexible guide rail being in position to permit the bottles to travel along the main conveyer; and Fig. 2 is a partial similar view, but with the hinged gate and flexible guide rail in position to stop the passage of articles along the main conveyer and permit the passage of articles to the main conveyer from the the tributary conveyer.

The main conveyer 10 is shown as of the endless chain type, and is driven in the direction of the arrow in any suitable manner. It is an impositive conveyer, carrying its load forward frictionally, so that such load can without damage slide rearward relatively to the conveyer. Positively feeding this main conveyer 10 may be any number of tributary conveyers 11, of which only one is shown. These tributary conveyers, which are also impositive conveyers, carrying their articles frictionally, and which may feed from either or both sides, receive their supply of articles, such as bottles A, from any suitable sources, such as bottle machines or bottle-filling machines. At the discharge end of each tributary conveyer 11, which is the end toward the main conveyer 10, there is a conveyer wheel or feeder star wheel 12 turning on a vertical axis over a table 13, by which feeder star wheel the positive feeding to the main conveyer is obtained. As shown, each tributary conveyer and its associated feeder star wheel are operated in common by a motor 14, which drives a shaft 15 connected by bevel gearing 16 to the vertical shaft 17 of the star wheel 12 and by a chain 18 and suitable sprockets to a shaft 19 carrying the driving sprocket 20 of the tributary conveyer chain 11. The feeder star wheel 12 receives the bottles or other articles from the associated tributary conveyer 11, slides them off such tributary conveyer and around on the table 13, within an arc-shaped guide rail 21, and discharges them positively from the table 13 obliquely on to the main conveyer 10 with a component of motion in the direction of travel of said main conveyer. An oblique guide rail 22 coöperates with the fingers of the star wheel 12 to force the bottles or other articles positively on to the main conveyer in this oblique direction.

In order to control the passage of the bottles A into the notches of the feeder star wheel 12, I provide a governor star wheel 25 near the discharge end of each tributary conveyer 11 and overlapping thereupon from the opposite side thereof from the arc-shaped guide rail 21 and from a spring-pressed fence rail 26 which extends along the auxiliary conveyer 11 and serves to force the bottles A toward that side of the conveyer over which the governor star wheel 25 projects. This governor star wheel 25 is of the character of that shown in my Patent No. 1,118,425, granted November 24, 1914, and acts to hold back the bottles A on the tributary conveyer 11 save at such times as they will be received properly into the notches in the rotating feeder star wheel 12. For this purpose, the governor star wheel 25 is provided with a series of latch teeth 27 equal in number to the fingers of such governor star wheel, and with these latch teeth a latch finger 28 carried by a spring-pressed plunger 29 coöperates so that the governor star wheel 25 is held from turning in a position where one of its fingers projects over a tributary conveyer 11 to stop the passage of bottles A therealong. The plunger 29 is provided at its end with a roller 30, which is engaged by upstanding pins 31 on the successive fingers of the feeder star wheel 12 as the latter turns so as to move the latch finger 28 against its spring out of engagement with a tooth 27 to permit the retarded bottle to turn the governor star wheel 25 and be carried along by the tributary conveyer into one of the notches of the feeder star wheel. The governor star wheel is located at such a distance from the feeder star wheel that it accomplishes this properly.

In order to prevent the bottles traveling along the main conveyer 10 from interfering with those which are positively fed on to the main conveyer from a tributary conveyer by a feeder star wheel 12, I hinge to the arc-shaped guide rail 21 at its discharge end a curved gate 35, which stands in the path of the oblique discharge from the feeder star wheel 12 on to the main conveyer 10 and when a bottle A is discharged by such feeder star wheel on to the main conveyer is swung from the position shown in Fig. 1 to the position shown in Fig. 2, or out over the main conveyer 10. Directly across the main conveyer 10 from the swinging gate 35 is a flexible guide rail 36, spring-mounted at its ends between arms 37 projecting over the main conveyer 10. This flexible guide rail is normally straight, as shown in Fig. 1, but if a bottle on the main conveyer is located between such flexible guide rail and a swinging gate 35 as such gate is swung to the position shown in Fig. 2 by reason of the discharge of a bottle on to the main conveyer from the feeder star wheel 12, such bottle already on the main conveyer is caught between the gate 35 and the guide rail 36, and the guide rail 36 is flexed as far as necessary, as shown in Fig. 2, so that such bottle already on the main conveyer is held from further movement along such main conveyer during the discharge of the bottle from the feeder star wheel. This effectively prevents collision between the two bottles. In order to provide for properly catching the bottles of different size on the main conveyer the flexible rail 36 may be adjusted laterally of the main conveyer, as by providing slots in the arms 37 to permit sliding of such arms on the bolts by which they are attached to the frame of the main conveyer.

In the same way, the oblique guide rail 22 is preferably adjustable longitudinally of the main conveyer.

In operation, the bottles are fed to the main conveyer 10 from the tributary conveyers 11, and the spacing of the bottles on the main conveyer is more or less irregular. Each tributary conveyer 11 discharges its bottles directly into its associated feeder star wheel 12, this discharge being governed by the governor star wheel 25 so that the bottles enter the notches of the star wheel properly and are not broken by the points of the feeder star wheel 12 as would otherwise at times be the case. The bottles are carried by the feeder star wheel 12 around the curved path determined by the arc-shaped guide rail 21, traveling against the inner face of such guide rail. When they reach the discharge end of this arc-shaped guide rail 21, they engage the hinged gate 35 and force it open, or to the position shown in Fig. 2, as they travel obliquely on to the main conveyer 10. If at this time there is a bottle traveling along the main conveyer 10 opposite the swinging gate 35, such bottle is caught between such gate as it opens and the flexible guide rail 36, and held against forward movement until the hinge gate 35 is permitted to swing back to its normal position, shown in Fig. 1, which occurs when the bottle being discharged by the feeder star wheel 12 has passed out of engagement with such gate and is completely on the main conveyer 10. As bottles are carried by the main conveyer 10 purely by friction, but are positively moved by the fingers of the feeder star wheel, the bottles being fed by the feeder star wheel always predominate in effect over those being carried by the main conveyer 10, so that the action in retarding the bottles traveling on the main conveyer always takes place as above described.

I claim as my invention:

1. In combination, an impositive main conveyer, a conveyer feeding positively to said main conveyer, a gate which is movable across the main conveyer by the discharge of an article from the second conveyer on to the main conveyer, and a yielding rail opposite such gate and coöperating therewith to grip an article on the main conveyer and hold it when such gate is moved across the main conveyer by the discharge of another article on to the main conveyer from the second conveyer.

2. In combination, a main conveyer, a feeder star wheel feeding to said main conveyer, a gate which is movable across the main conveyer by the discharge of an article from said feeder star wheel on to the main conveyer, and a yielding rail opposite such gate and coöperating therewith to grip an article on the main conveyer and hold it when such gate is moved across the main conveyer by the discharge of another article on to the main conveyer from the feeder star wheel.

3. In combination, a main conveyer, a conveyer feeding to said main conveyer, a gate which is movable across the main conveyer by the discharge of an article from the second conveyer on to the main conveyer, and a yielding rail opposite such gate and coöperating therewith to grip an article on the main conveyer and hold it when such gate is moved across the main conveyer by the discharge of another article on to the main conveyer from the second conveyer.

4. In combination, an impositive main conveyer, an impositive tributary conveyer, a feeder star wheel receiving articles from the tributary conveyer and discharging them positively on to the main conveyer, a gate which is movable across the main conveyer by the discharge of an article from said feeder star wheel on to the main conveyer, and a yielding rail opposite such gate and coöperating therewith to grip an article on the main conveyer and hold it when such gate is moved across the main conveyer by the discharge of another article on to the main conveyer from the feeder star wheel.

5. In combination, a main conveyer, a tributary conveyer, a feeder star wheel receiving articles from the tributary conveyer and discharging them on to the main conveyer, a gate which is movable across the main conveyer by the discharge of an article from said feeder star wheel on to the main conveyer, and a yielding rail opposite such gate and coöperating therewith to grip an article on the main conveyer and hold it when such gate is moved across the main conveyer by the discharge of another article on to the main conveyer from the feeder star wheel.

6. In combination, an impositive main conveyer, a conveyer feeding positively to said main conveyer, a gate which is movable across the main conveyer by the discharge of an article from the second conveyer on to the main conveyer, and a rail opposite such gate and coöperating therewith to grip an article on the main conveyer and hold it when such gate is moved across the main conveyer by the discharge of another article on to the main conveyer from the second conveyer.

7. In combination, a main conveyer, a feeder star wheel feeding to said main conveyer, a gate which is movable across the main conveyer by the discharge of an article from said feeder star wheel on to the main conveyer, and a rail opposite such gate and coöperating therewith to grip an article on the main conveyer, and hold it when such gate is moved across the main conveyer by the discharge of another article on to the main conveyer from the feeder star wheel.

8. In combination, a main conveyer, a tributary conveyer, a feeder star wheel receiving articles from the tributary conveyer, and discharging them on to the main conveyer, a gate which is movable across the main conveyer by the discharge of an article from said feeder star wheel on to the main conveyer, and a rail opposite such gate and coöperating therewith to grip an article on the main conveyer and hold it when such gate is moved across the main conveyer by the discharge of another article on to the main conveyer from the feeder star wheel.

9. In combination, a main conveyer, a tributary conveyer, said two conveyers carrying articles resting thereon by friction with the articles, a feeder star wheel receiving articles from the tributary conveyer and discharging them on to said main conveyer, said feeder star wheel moving said articles by positively pushing them, a gate which is movable across the main conveyer by the feeding of articles to the main conveyer by said feeder star wheel, and a rail opposite said gate and coöperating therewith to grip an article already on the main conveyer to hold it from approaching the junction point at which the feeder star wheel discharges when said gate is moved across the main conveyer by the discharge of an article on to the main conveyer from the feeder star wheel.

10. In combination, a main conveyer, said conveyer carrying articles resting thereon by friction with the articles, a feeder star wheel discharging articles on to said main conveyer, said feeder star wheel moving said articles by positively pushing them, a gate which is movable across the main conveyer by the feeding of articles to the main conveyer by said feeder star wheel, and a rail opposite said gate and coöperating therewith to grip an article already on the main conveyer to hold it from approaching the junction point at which the feeder star wheel discharges when said gate is moved across the main conveyer by the discharge of an article on to the main conveyer from the feeder star wheel.

11. In combination, a main conveyer, said conveyer carrying articles resting thereon by friction with the articles, a feeder star wheel discharging articles on to said main conveyer, said feeder star wheel moving said articles by positively pushing them, a gate which is movable across the main conveyer by the feeding of articles to the main conveyer by said feeder star wheel, and a yielding rail opposite said gate and coöperating therewith to grip an article already on the main conveyer to hold it from approaching the junction point at which the feeder star wheel discharges when said gate is moved across the main conveyer by the discharge of an article onto the main conveyer from the feeder star wheel.

In witness whereof, I have hereunto set my hand at Indianapolis, Indiana, this 14th day of July, A. D. one thousand nine hundred and seventeen.

WILLIAM H. JOHNSON.